United States Patent
Moro et al.

(10) Patent No.: US 6,769,647 B2
(45) Date of Patent: Aug. 3, 2004

(54) AUTOMATIC INFLATION SYSTEM FOR EVACUATION SLIDE

(75) Inventors: Ramon J. Moro, Gilbert, AZ (US); Luther D. Ware, Phoenix, AZ (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 10/295,505

(22) Filed: Nov. 15, 2002

(65) Prior Publication Data

US 2004/0094671 A1 May 20, 2004

Related U.S. Application Data

(60) Provisional application No. 60/373,758, filed on Apr. 18, 2002.

(51) Int. Cl.[7] .............................................. B64D 25/14
(52) U.S. Cl. .................................... 244/137.2; 244/905
(58) Field of Search .............................. 244/137.2, 905; 182/48; 193/256

(56) References Cited

U.S. PATENT DOCUMENTS

| | | | | |
|---|---|---|---|---|
| 2,765,131 A | * | 10/1956 | Boyle ....................... | 244/137.2 |
| 3,102,623 A | * | 9/1963 | Schacht et al. .......... | 244/137.2 |
| 3,463,287 A | | 8/1969 | Smith | |
| 3,465,991 A | | 9/1969 | Banas et al. | |
| 3,598,215 A | * | 8/1971 | Summer et al. ......... | 244/137.2 |
| 3,852,854 A | | 12/1974 | Sigrud et al. | |
| 3,910,532 A | * | 10/1975 | Fischer .................... | 244/137.2 |
| 4,013,247 A | | 3/1977 | Giffin | |
| 4,106,729 A | | 8/1978 | Bergman et al. | |
| 4,375,877 A | * | 3/1983 | Shorey .................... | 244/137.2 |
| 4,441,582 A | * | 4/1984 | Ward, Jr. ................. | 244/137.2 |
| 5,360,186 A | * | 11/1994 | Danielson et al. ....... | 244/137.2 |
| 5,586,615 A | * | 12/1996 | Hammer et al. ......... | 244/137.2 |
| 5,871,180 A | * | 2/1999 | Hublikar ................. | 244/137.2 |
| 5,906,340 A | * | 5/1999 | Duggal ................... | 244/137.2 |

* cited by examiner

Primary Examiner—Michael J. Carone
Assistant Examiner—L. Semunegus
(74) Attorney, Agent, or Firm—Jerry J. Holden; John D. Titus

(57) ABSTRACT

An inflatable emergency evacuation slide system comprises a slide pack (60) with an emergency evacuation slide (10) stored in an uninflated, folded condition together with an inflator (30). A manual inflation lanyard (38) having a mechanical stop (44), such as a crimped ferrule located along its length, is routed in a conventional manner to a point proximal the girt bar (64) securing the evacuation slide (10) to the aircraft (20). The manual inflation lanyard (38) is routed through a grommet (46) at one end of an automatic inflation lanyard (50), the other end of which is attached to the aircraft exit door (18). In operation, when the aircraft exit door (18) is opened in the armed condition, the evacuation slide pack (60) is released from its storage compartment and is dropped from the emergency evacuation exit. As the free end (70) of the slide drops away from the emergency exit, the automatic inflation lanyard (50) reaches its limit of travel and the grommet (46) bears on the mechanical stop (44) located on the manual inflation lanyard (38). This action causes the manual inflation lanyard (38) to be withdrawn from the initiator (36) of the inflator (30) thereby beginning the inflation of the emergency evacuation slide (10).

6 Claims, 4 Drawing Sheets

AUTOMATIC INFLATION SYSTEM FOR EVACUATION SLIDE

This application claims the benefit of U.S. Provisional Application No.: 60/373,758 filed on Apr. 18, 2002.

BACKGROUND OF THE INVENTION

This invention relates to emergency evacuation equipment for aircraft, in particular, to inflatable aircraft evacuation slides.

The requirement for reliably evacuating airline passengers in the event of emergency is well-known. Emergencies at take-off and landing often demand swift removal of the passengers from the aircraft because of the potential of injuries from fire, explosion, or sinking in water. A conventional method of quickly evacuating a large number of passengers from an aircraft is to provide multiple emergency exits, each of which is equipped with an inflatable evacuation slide.

These inflatable evacuation slides are normally stored in an uninflated condition in a container, or packboard, requiring a minimum of space in the interior of the aircraft and are typically mounted on or adjacent to the interior of the aircraft exit door. Early inflatable evacuation slides required the slide pack to be released from its storage compartment manually and after the slide was dropped from the aircraft, a cabin attendant was required to operate a suitable inflation triggering device to actuate a valve to initiate inflation. Such manual operation of the trigger device required the attendant to wait until the slide pack was properly dropped and then to stoop or reach for the triggering device to operate it. These inherent shortcomings led to the later introduction of automatic inflation systems for emergency evacuation slides.

One such automatic inflation system for emergency evacuation slides, which typifies the prior art, is described in U.S. Pat. No. 3,463,287 to Smith. In the prior art slide, the slide is stored in a folded packed condition on or adjacent to the door of the aircraft with the head end girt secured to the aircraft fuselage. The inflation system comprises a source of pressurized fluid such as compressed gas that is connected through a valve to the inflation port of the evacuation slide. The valve is operated by withdrawing a lanyard from the valve. The free end of the lanyard is attached to the girt of the evacuation slide so that the amount of slack in the lanyard is less than the amount of slack in the girt. Consequently, as the slide pack is dropped out of the aircraft door, the lanyard is tensioned by the weight of the falling slide pack before the girt is fully extended. In practice, the length of the lanyard is selected so that the valve will not operate prematurely if the slide is accidentally dropped onto the floor of the aircraft or jetway, but will operate to initiate the inflation as early as possible during the fall of the packed slide. Aviation regulations require emergency evacuation slides of this type to be equipped with a manual pull lanyard. Consequently, the free end of the lanyard is often equipped with a pull handle so that a single lanyard can act both as the automatic inflation and the manual inflation initiator.

Prior art automatic inflation systems operate well with relatively large and heavy slides, with large sill heights. However, smaller, lighter slides with short girts do not initiate reliably using the prior art inflation systems. Moreover, in cold weather when the rubberized fabric girt becomes stiff, even larger slides do not initiate reliably if the weight of the slide is insufficient to overcome the stiffness of the folded girt. Accordingly, what is needed is an automatic inflation system for evacuation slides that does not rely on the fabric girt being stretched by the weight of the slide pack in order to initiate inflation of the emergency evacuation slide.

SUMMARY OF THE INVENTION

The present invention comprises an inflatable emergency evacuation slide system in which the automatic initiation lanyard to initiate inflation of the emergency evacuation slide is connected to the door of the aircraft or to the aircraft fuselage, rather than to the girt of the slide itself. In an illustrative embodiment, the evacuation slide system comprises a slide pack with an emergency evacuation slide stored in an uninflated, folded condition together with an inflator. A manual inflation lanyard is routed in a conventional manner to a point proximal the girt bar securing the evacuation slide to the aircraft. The manual inflation lanyard has a mechanical stop, such as a crimped ferrule located along its length. The manual inflation lanyard is routed through a grommet at one end of an automatic inflation lanyard, the other end of which is attached to the aircraft exit door. In operation, when the aircraft exit door is opened in the armed condition, the evacuation slide pack is released from its storage compartment and is dropped from the emergency evacuation exit. As the free end of the slide drops away from the emergency exit, the automatic inflation lanyard reaches its limit of travel and the grommet bears on the mechanical stop located on the manual inflation lanyard. This action causes the manual inflation lanyard to be withdrawn from the initiator of the inflation system thereby beginning the inflation of the emergency evacuation slide. Because an emergency evacuation slide constructed in accordance with the teachings of the present invention utilizes the weight of the free end of the slide pack to withdraw the firing lanyard from the inflator initiator rather than the weight of the slide pack overcoming the resistance of the fabric girt, an emergency evacuation system constructed in accordance with the teachings of the present invention is much more reliable in initiating inflation of smaller light weight slides as well as all slides under cold temperature conditions.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
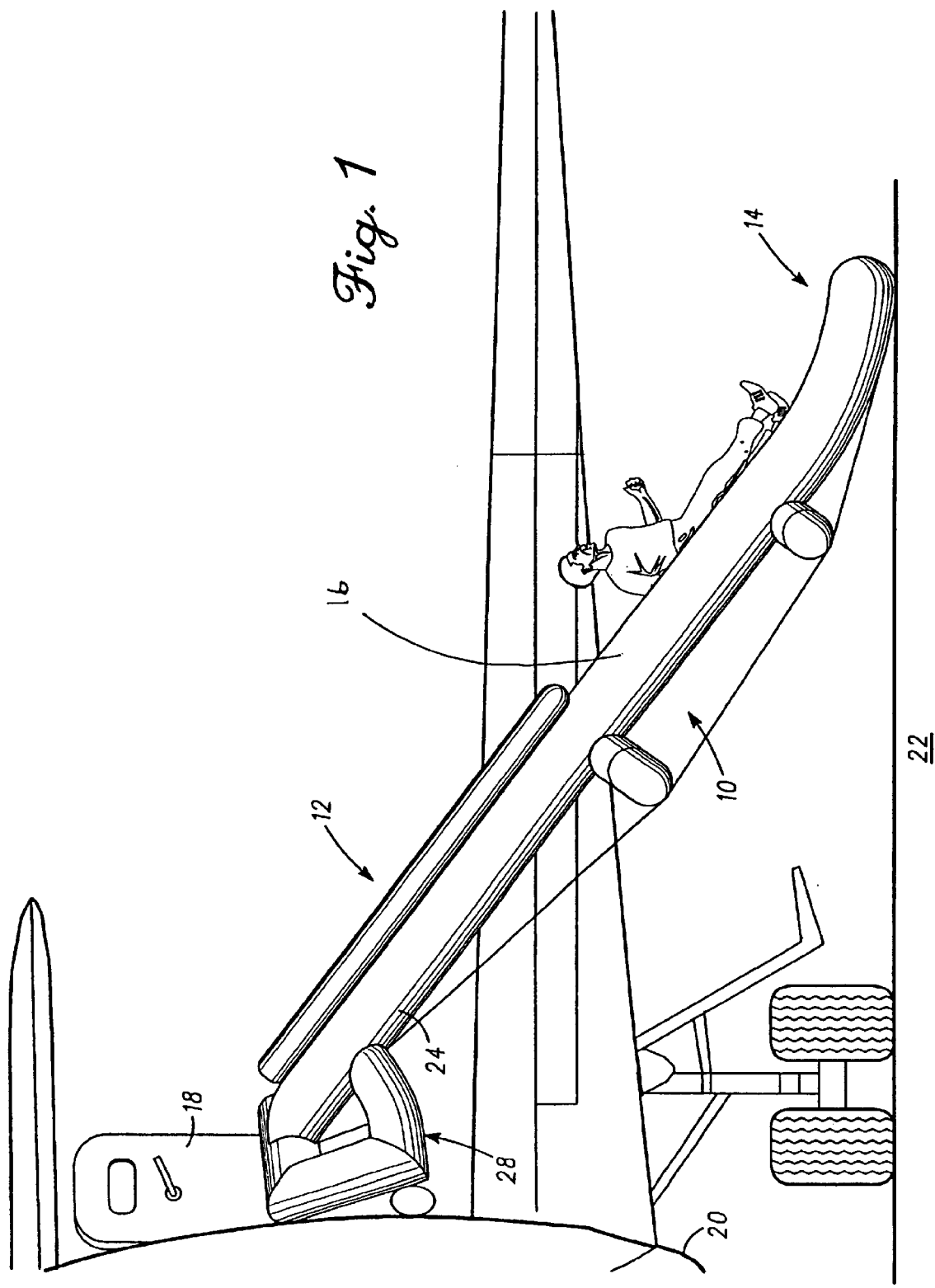
FIG. 1 is a side view of an evacuation slide incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an inflatable evacuation slide assembly 10 incorporating features of the present invention. Evacuation slide assembly 10 generally comprises a head end 12 and a foot end 14. Head end 12 is configured to couple evacuation slide assembly 12 to an exit door 18 of an aircraft 20 while foot end 14 is in contact with the ground 22 such that the slide assembly 10 provides a sloping surface to permit the rapid egress of passengers from aircraft 20. The entire inflatable evacuation slide assembly 10 is preferably fabricated from an air impervious material such as a lightweight fabric that has been coated with an elastamer such as rubber or urethane. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all the chambers comprising the structure interconnected pneumatically, such that a single pressurized gas source, such as compressed carbon-dioxide, nitrogen, argon, a pyrotechnic gas generator, or hybrid pyrotechnic/compressed gas generator may be utilized for its deployment. The main body of evacuation slide assembly 10 comprises a plurality of inflatable beams 16 including a pair of longitudinally extending rail tubes 24 that extend from the head end truss assembly 28 to the ground 22.

Figure 2:
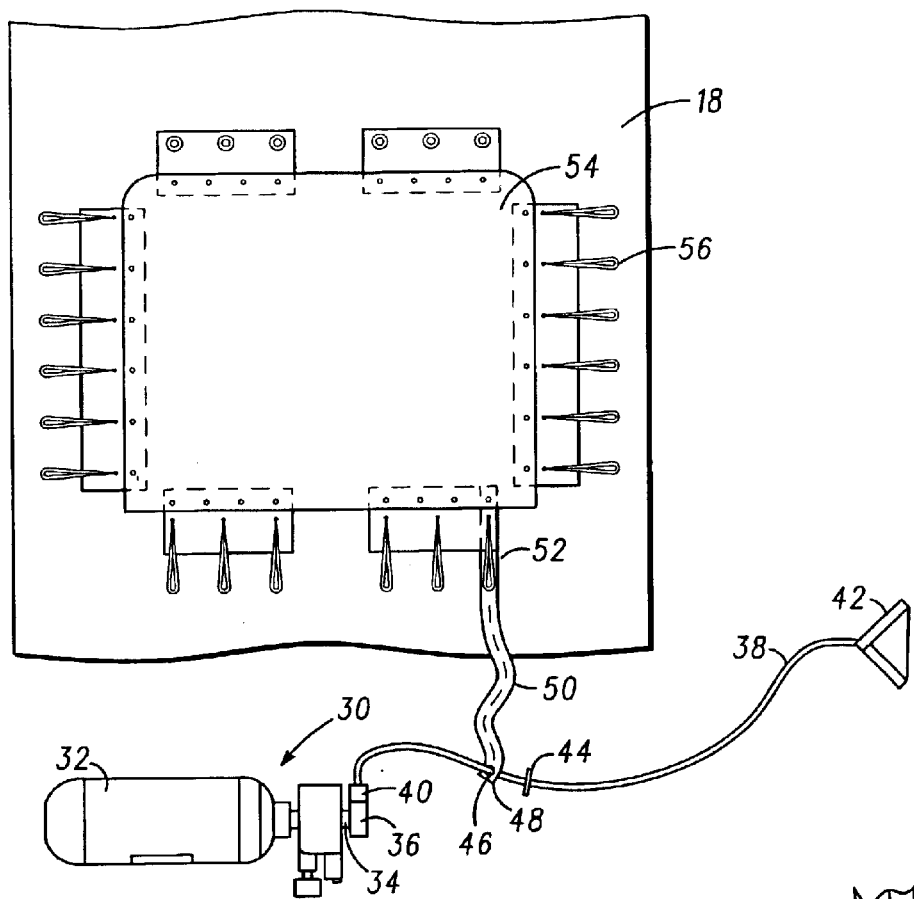
FIG. 2 is partial plan view of an inflatable emergency evacuation slide system incorporating features of the present invention.

As shown in FIG. 2, an inflator 30 comprises housing 32 containing a source of inflation gas for inflating emergency evacuation slide assembly 10. As noted hereinbefore the source of inflation gas contained within housing 32 may be compressed gas, pyrotechnic, or a hybrid inflation system consisting of a stored compressed gas and pyrotechnic generator, or other existing or future source of inflation gas. Inflator 30 further includes a regulator valve 34 which is normally closed for storage. Regulator valve 34 includes an initiator 36 that is activated by withdrawing a manual initiation lanyard 38. Initiator 36 may be a conventional ball detent, pin actuated, pyrotechnic, electrically actuated, or other conventional valve that is initiated by withdrawing a suitable member from the initiator housing 40 or otherwise by tensioning a lanyard.

Manual initiation lanyard 38 includes a pull handle 42 and a mechanical stop 44 the function of which will be described in detail hereinafter. Pull handle 42 may be a fabric loop, plastic handle or other suitable handle to enable flight attendant to initiate inflation of the emergency evacuation slide in the event of a failure of the automatic inflation system as required by Federal Aviation Administration Regulations. Mechanical stop 44 may be a suitable ferrule crimped onto manual initiation lanyard 38, a knot tied in manual initiation lanyard 38, or other fitting for enlarging the cross section of manual initiation lanyard 38 for preventing it from passing through an aperture. Manual initiation lanyard 38 passes through a grommet 46 located between mechanical stop 44 and initiator housing 40. Grommet 46 reinforces a distal end 48 of an automatic initiation lanyard 50 which has a proximal end 52 attached to packboard 54 which, in turn, is mounted to exit door 18. Packboard 54 retains inflator 30 and inflatable evacuation slide assembly 10 (not shown in FIG. 2) in the uninflated folded condition for storage by means of conventional speed lacing 56.

Figure 3:
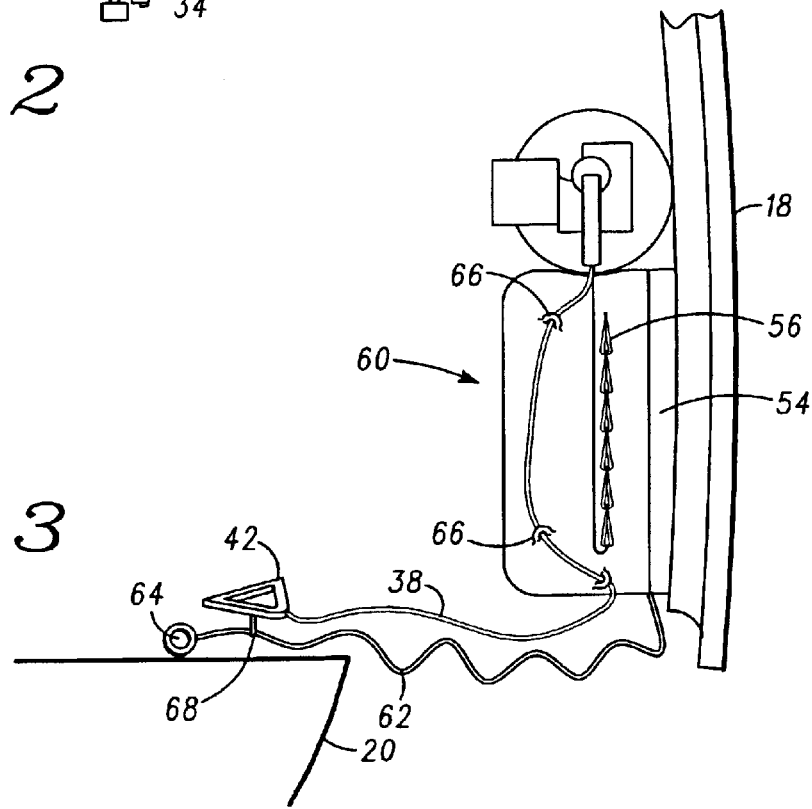
FIG. 3 is a schematic view showing the sequence of operation of an inflatable emergency evacuation slide system incorporating features of the present invention.

With reference to FIG. 3, as exit door 18 is opened in the armed condition, speed lacing 56 is released to allow the slide pack 60 consisting of inflator 30 and evacuation slide assembly 10 to drop away from packboard 54. As slide pack 60 falls away from door 18, the fixed end 72 is secured to aircraft 20 by girt 62 which is secured to aircraft 20 by girt bar 64. Manual initiation lanyard 38 is routed in a conventional manner through fair leads 66 within slide pack 60 and along girt 62. Pull handle 42 of manual initiation lanyard 38 may be retained in an out-of-the-way position by retainer 68 typically comprising hook and loop fasteners, snaps or other quickly releasable fasteners.

Figure 4:
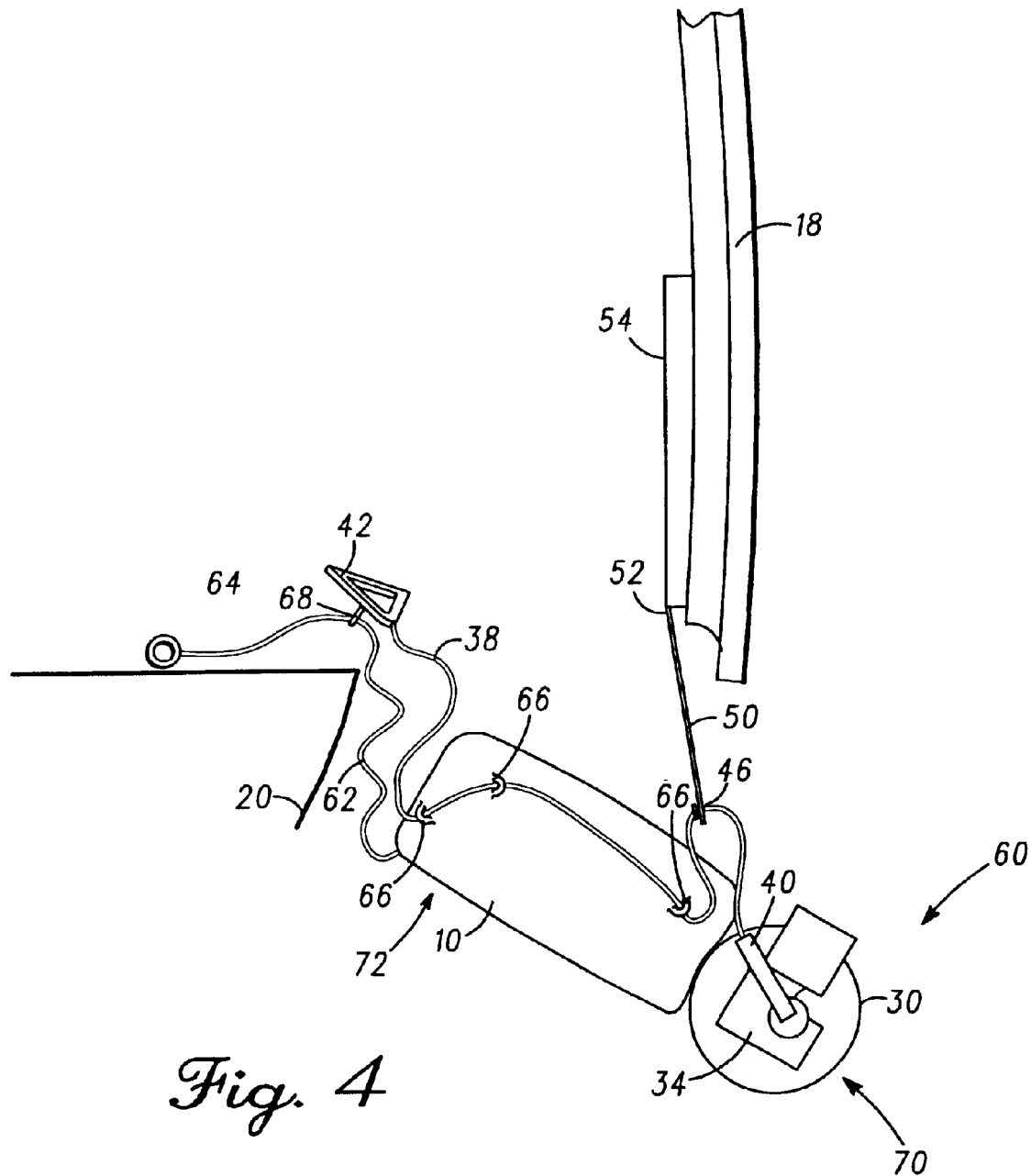
FIG. 4 is a schematic view showing the sequence of operation of an inflatable emergency evacuation slide system incorporating features of the present invention showing the slide pack dropping and the automatic initiation lanyard reaching its limit of travel.

With reference to FIG. 4, as slide pack 60 falls away from door 18 slide pack 60 tends to rotate such that free end 70 of slide pack 60 falls away faster than fixed end 72 which is slowed by the unfolding of girt 62 which is attached to aircraft 20. As free end 70 falls away, automatic initiation lanyard 50, which is fixed to packboard 54, extends to its full length. As automatic initiation lanyard 50 reaches its fullest extent, grommet 46 bears against mechanical stop 44 causing manual initiation lanyard 38 to be tensioned and withdrawn from initiator housing 40 of regulator valve 34. Withdrawal of manual initiation lanyard 38 causes the initiator 36 to initiate a flow of inflation gases from inflator 30 into evacuation slide assembly 10. As can be seen from FIG. 4, the line of action from proximal end 52 of automatic initiation lanyard 50 to initiator housing 40 passes through a point proximal free end (i.e. at least outboard of the midpoint of slide pack 60). Accordingly, the freely falling free end 70 reliably actuates initiator 36 without interference from the unfolding girt 62.

Figure 5:
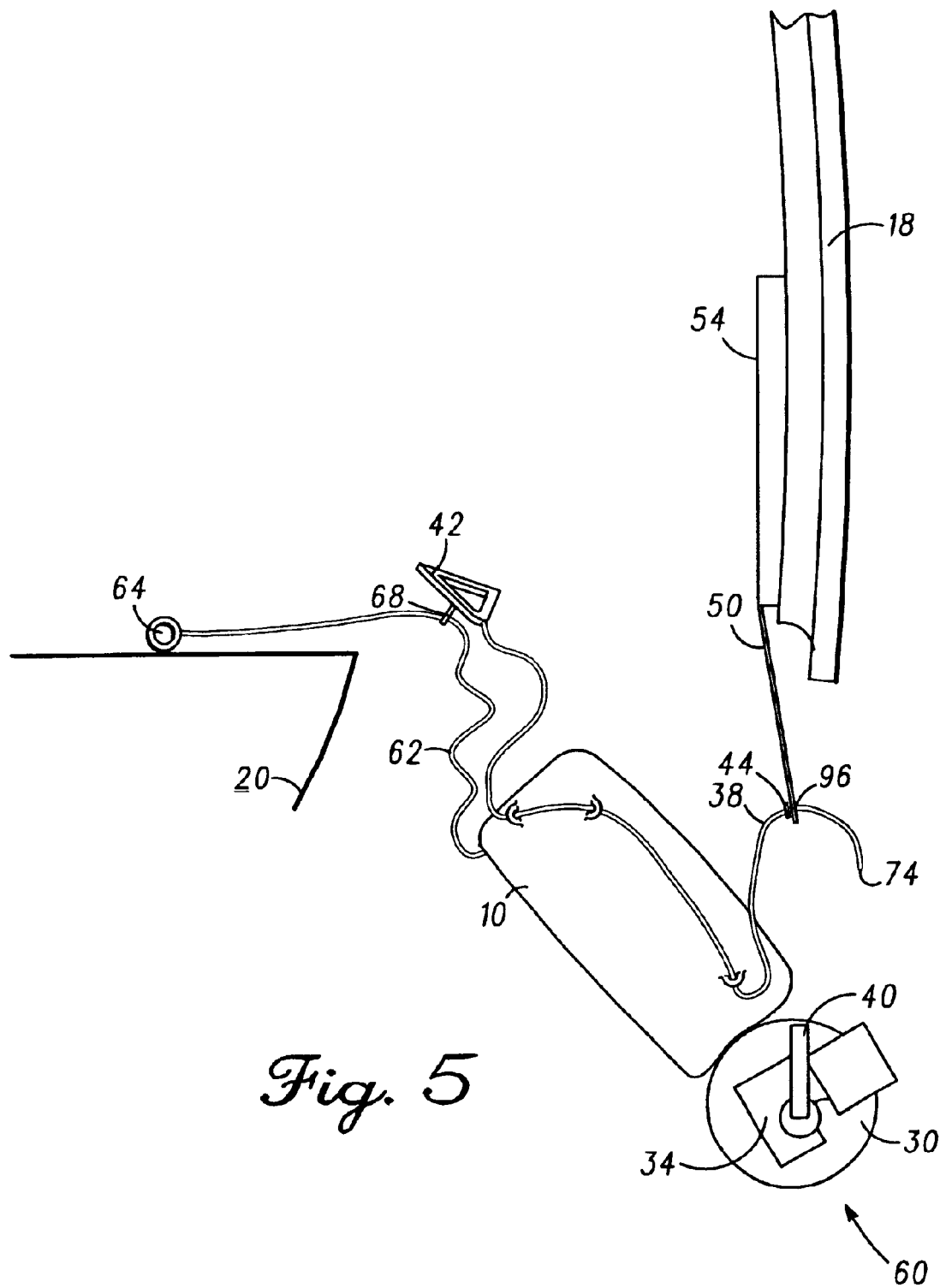
FIG. 5 is a schematic view showing the sequence of operation of an inflatable emergency evacuation slide system incorporating features of the present invention showing the manual inflation lanyard withdrawn from the initiator of the inflator.

As shown in FIG. 5, once the initiator end 74 of manual initiation lanyard 38 has been withdrawn from initiator housing 40, and the inflation gases begin to flow from inflator 30 into evacuation slide assembly 10, slide pack 60 continues to fall away from door 18. In order to prevent manual initiation lanyard 38 from fouling the slide 10 as it deploys, grommet 46 of automatic initiation lanyard 50 is sized and shaped so as to insure that the initiator end 74 passes freely through grommet 46 once initiator end 74 has been withdrawn from initiator housing 40. Additionally, automatic initiation lanyard 50 may include one or more elastic members to cause it to retract upward and out of the way toward packboard 54 once the tension from the falling slide pack 60 has been released. This prevents automatic initiation lanyard 50 from possibly becoming ingested by a slide aspirator or other equipment.

Although certain illustrative embodiments and methods have been disclosed herein, it will be apparent from the foregoing disclosure to those skilled in the art that variations and modifications of such embodiments and methods may be made without departing from the spirit and scope of the invention. For example, in lieu of the sliding connection between grommet 46 and manual initiation lanyard 38, the distal end of automatic initiation lanyard 50 could be attached to manual initiation lanyard 38 at an appropriate location. Automatic initiation lanyard could be configured to break away from packboard 54 in lieu of configuring the initiator end of manual initiation lanyard 38 to pass through the end of automatic initiation lanyard 50. Similarly, although in illustrative embodiment free end 70 of slide pack 60 is attached via automatic lanyard 50 to the door at the aircraft, it is not critical that the lanyard be attached to the door, so long as free end 70 is free to fall away. For example, automatic initiation lanyard 50 could be attached to the aircraft exit opening or otherwise to the fuselage as long as it is attached high enough in the opening to effect initiation as free end 70 falls away. Accordingly, it is intended that the invention shall be limited only to the extent required by the appended claims and rules and principals of applicable law.

What is claimed is:

1. An inflatable evacuation slide system for use with an aircraft having an exit opening and a door for covering said exit opening, said inflatable evacuation slide system comprising:

an inflatable evacuation slide stored in an uninflated condition prior to deployment, said inflatable evacuation slide comprising a plurality of inflatable beams presenting a slide surface extending in a deployed condition from an upper end attached to said aircraft proximal said exit opening downward toward a lower support surface;

an inflator comprising a source of inflation gas within an inflator housing mechanically attached and fluidically connected to said inflatable evacuation slide, said inflator comprising an initiator having an initiator housing, said initiator being responsive to withdrawal of a lanyard for initiating a flow of inflation gas from said inflator housing to said inflatable evacuation slide;

an automatic-actuating lanyard having a proximal end and a distal end, said distal end being operably attached to said initiator and said proximal end being attached to said exit door such that as said exit door is opened and said evacuation slide is ejected from said exit opening, relative motion between said door and said initiator housing withdraws said automatic-actuating lanyard from said initiator to cause said initiator to initiate a flow of inflation gas from said housing to said inflatable evacuation slide; and a manual initiation lanyard, said manual initiation lanyard having an initiator end and a free end, said initiator end terminating at said initiator housing, said manual initiation lanyard further including a mechanical stop intermediate of said initiator end and said free end, said mechanical stop providing means for coupling said automatic-initiation lanyard to said manual initiation lanyard whereby tension in said automatic-initiation lanyard is coupled to said manual initiation lanyard for withdrawing said initiation end of said manual initiation lanyard from said initiator housing.

2. An inflatable evacuation slide system for use with an aircraft having an exit opening with an exit door, said inflatable evacuation slide system comprising:

an inflatable evacuation slide having a main body portion, a head end, and a foot end; said head end being attached to said aircraft proximal said exit opening;

an inflator fluidically connected to said inflatable evacuation slide and mechanically attached to said main body portion, said inflator having a lanyard-actuated initiator for initiating a flow of inflation gas from said inflator to said inflatable evacuation slide;

an automatic-actuating lanyard having a first end attached to said exit door and a second end having an aperture; and a manual initiation lanyard having a first end attached to said aircraft proximal said exit opening and a second end attached to said lanyard-actuated initiator, said manual initiation lanyard having an intermediate portion passing through said aperture, said intermediate portion further including a mechanical stop for preventing said manual initiation lanyard from passing through said aperture beyond said mechanical stop;

whereby as said exit door is opened, the aperture in said automatic actuating lanyard is drawn along said manual initiation lanyard until coming to rest against the mechanical stop, whereupon said automatic-actuating lanyard acting against said mechanical stop withdraws said second end of said manual initiation lanyard from said lanyard-actuated initiator thereby causing said initiator to initiate a flow of inflation gas to inflate said inflatable evacuation slide.

3. The inflatable evacuation slide system of claim 2, wherein:

said head end is attached to said aircraft by means of a fabric girt.

4. The inflatable evacuation slide system of claim 2, wherein:

said lanyard-actuated initiator is a valve.

5. The inflatable evacuation slide system of claim 2, wherein:

said automatic-actuating lanyard further comprises an elastic member for retracting said automatic-actuating lanyard following initiation of said initiator.

6. An inflatable evacuation slide system for use with an aircraft having an exit opening with an exit door, said inflatable evacuation slide system comprising:

an inflatable evacuation slide having a main body portion, a head end, and a foot end, said inflatable evacuation slide being stored in an uninflated condition as a slide pack with a fixed end and a free end, said fixed end being attached to said aircraft proximal said exit opening;

an inflator fluidically connected to said inflatable evacuation slide and mechanically attached to said slide pack, said inflator having a lanyard-actuated initiator for initiating a flow of inflation gas from said inflator to said inflatable evacuation slide, said lanyard-actuated initiator being located proximal said free end of said slide pack;

an automatic-inflation lanyard having a proximal end attached to said aircraft and a distal end operably attached to said lanyard-actuated initiator; and a manual initiation lanyard, said manual initiation lanyard having an initiator end and a free end, said initiator end terminating at said lanyard-actuated initiator, said manual initiation lanyard further including a mechanical stop intermediate of said initiator end and said free end, said mechanical stop providing means for coupling said automatic-initiation lanyard to said manual initiation lanyard whereby tension in said automatic-initiation lanyard is transferred to said manual initiation lanyard for withdrawing said manual initiation lanyard from said lanyard-actuated initiator;

whereby as said slide pack is ejected from said aircraft, said free end falls away from said aircraft a sufficient distance to cause said automatic-inflation lanyard to operate said lanyard actuated initiator.

\* \* \* \* \*